United States Patent [19]
Robitschko et al.

[11] Patent Number: 6,087,612
[45] Date of Patent: Jul. 11, 2000

[54] PROCESS FOR MARKING INDUSTRIAL PRODUCTS OR PARTS

[75] Inventors: Peter Robitschko, Sindelfingen; Dietbert Kollbach, Esslingen; Bernhardt Dilz, Sindelfingen, all of Germany

[73] Assignee: DaimlerChrysler AG, Germany

[21] Appl. No.: 09/129,391

[22] Filed: Aug. 5, 1998

[30] Foreign Application Priority Data

Aug. 5, 1997 [GB] United Kingdom ............... 197 33 786

[51] Int. Cl.[7] .................................................... B23K 11/10
[52] U.S. Cl. ........................ 219/87; 219/86.24; 219/91.1
[58] Field of Search .......................... 219/86.24, 76.14, 219/87, 88, 91.1

[56] References Cited

U.S. PATENT DOCUMENTS

| | | | |
|---|---|---|---|
| 1,533,239 | 4/1925 | Eschholz | 219/76.14 |
| 1,533,300 | 4/1925 | Baker | 219/76.14 |
| 3,508,801 | 4/1970 | Smith | 219/87 |

FOREIGN PATENT DOCUMENTS

| | | |
|---|---|---|
| 0 178 158 A2 | of 1985 | European Pat. Off. . |
| 0 308 718 A2 | of 1988 | European Pat. Off. . |
| 40 03 954 C1 | of 1999 | Germany . |
| 07-326552 | of 1995 | Japan . |
| 8-71648 | 3/1996 | Japan . |
| WO 79/00989 | 11/1979 | Sweden . |
| 2 260 637 | of 1993 | United Kingdom . |

*Primary Examiner*—Patrick Ryan
*Assistant Examiner*—Anjan Dey
*Attorney, Agent, or Firm*—Evenson, McKeown, Edwards & Lenahan, P.L.L.C.

[57] ABSTRACT

In a process for marking industrial products or parts, a plurality of spot welds serve as carriers of characterizing information, especially in encoded information. Information is encoded in said spot welds by varying the position of each weld relative to a reference position.

17 Claims, 1 Drawing Sheet

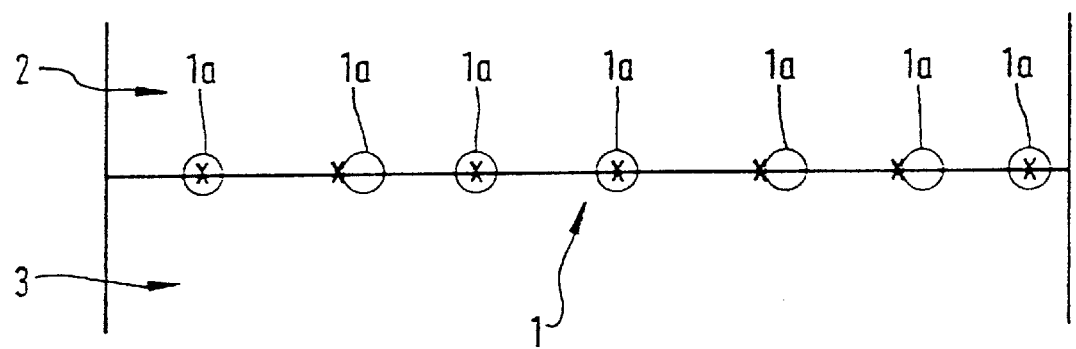

PROCESS FOR MARKING INDUSTRIAL PRODUCTS OR PARTS

BACKGROUND AND SUMMARY OF THE INVENTION

This application claims the priority of German patent document 197 33 786.4, filed Aug. 5, 1997, the disclosure of which is expressly incorporated by reference herein.

The present invention relates to a process for marking industrial products or parts with information such as may be used, for example, for identification purposes.

It is known to provide motor vehicles with a test number during manufacturing, for individualization for example or to make theft more difficult. Test numbers of this kind are applied for example to plaques or identification plates that are fastened permanently and durably to the motor vehicle until it is scrapped. A plaque of this kind can be made with visually legible alphanumeric characters or with machine-readable characters that are in binary encoded form for example, as disclosed in German patent document DE-AS 26 16 436, for example. However, the disadvantage of such plaques is that if they are removed, an individual vehicle frequently can no longer be recognized simply and easily.

An arrangement for marking industrial products by using a high energy beam, especially a laser beam, to burn alphanumeric characters and/or company marks into the surface of the workpiece is disclosed in German patent document 37 28 622. In this manner, individualized information can be applied theoretically at any point on the industrial product, such as a motor vehicle for example. However, such marking is expensive and cumbersome, requiring special lasers to be made available for example.

The object of the invention is to provide an economical and easily performed process for marking of industrial products or individual parts thereof.

These and other objects and advantages are achieved by the process, in simple fashion and without additional expense, by using spot welds that are made on industrial products. Since spot welds are provided in any case, no additional costs result. In addition, marking can be performed in essentially the same time that is required for welding. Advantageously, the welds in at least one row of spot welds serve to connect parts of the industrial product, and also serve as carriers of characterizing information. As a result, it is possible to provide the desired markings in any desired row of spot welds on a vehicle body, for example. No additional expense is incurred by comparison with conventional spot welding.

In a preferred embodiment of the invention, the spot welds in a row of spot welds carry the characterizing information, especially in binary encoded form, by varying their individual positions relative to their respective reference positions. For example each spot weld in a row, during manufacture of the body-in-white, can be made so that it is deliberately offset by a certain amount relative to a specified reference position in the lengthwise direction and/or the direction of the row of spot welds, so that a binary value of 0 or 1, can be assigned to each spot weld depending on the direction of the offset. For example, it is also possible to assign one set position a binary value of 0 or 1 and to assign another offset position the corresponding other binary value. In this way, a long row of spot welds that may be in several parts can carry binary encoded information that can be used to identify the vehicle. This primary information can be rendered unrecognizable or not understandable to the thief by further encoding, known only to the manufacturer for example. The code can be changed as necessary.

It is especially preferred that the characterizing information be readable visually and/or by means of a code key. This ensures that both rapid visual checking as well as more cumbersome machine testing, that involves a greater degree of safety, can be performed to show that an industrial product is genuine.

According to one advantageous embodiment, the characterizing information contains a serial number and/or information about the place of manufacture and/or a test number. It is possible for example to provide such information embedded in a row of spot welds so that respective data can be extracted correctly only with a matching code key.

Other objects, advantages and novel features of the present invention will become apparent from the following detailed description of the invention when considered in conjunction with the accompanying drawings.

BRIEF DESCRIPTION OF THE DRAWINGS

The single FIGURE shows schematically a row of spot welds 1 containing spot welds for connecting two body parts.

DETAILED DESCRIPTION OF THE DRAWINGS

Referring to the FIGURE, the individual spot welds 1a for connecting two body parts 2,3 are indicated by circles. The required (or "reference") positions of these spot welds 1a are marked by crosses. It is evident that some of the spot welds correspond with the set reference positions and some do not. In the embodiment shown, the second, fifth, and sixth spot welds (reading from left to right) have been offset to the right relative to their set reference positions. According to the embodiment shown, each spot weld 1a whose position corresponds with its set position may be assigned a binary value of 0, for example, while each of the spot welds 1a that is offset from the set position is assigned a binary value of 1. The row of spot welds shown thus contains the binary encoded information and/or the binary value of 0100110. (It is of course apparent that the assignment of values to the respective positions could also be reversed, so that the binary value in FIG. 1 is 1011001.) Such a binary value can represent information that can be read directly or is encoded.

Such rows of spot welds that are encoded to represent markings can be provided in any fashion in rows of spot welds on body parts to be joined. It should be noted in this connection that the rows of spot welds intended to be used as information carriers must be selected so that these spot welds can be preserved unchanged in their original state, even during extensive rebuilding, modification, or repair work. Subsequent additional application of spot welds must not be possible, or in any event must be clearly recognizable.

The degree of offset of the respective spot welds relative to their set positions can be varied more or less depending on the requirements of the specific welded seam. Usually, however, deviations or offsets of ±2 mm from the set position can be read in simple fashion both visually and by machine.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for marking of industrial products or parts in which individual components are joined by means of spot welds, said process comprising:

using said spot welds as a carrier of a characterizing item of information.

2. A process for marking of industrial products or parts according to claim 1 wherein said information is encoded.

3. Process according to claim 1, wherein that spot welds of at least one row of spot welds serve to connect parts of the industrial products as carriers of the characterizing information.

4. Process according to claim 3, wherein spot welds of a row of spot welds convey the characterizing information by relative positioning with reference to respective reference positions thereof.

5. Process according to claim 4 wherein said characterizing information is in binary coded form.

6. Process according to claim 1, wherein the characterizing information is readable by at least one of visually and by machine.

7. Process according to claim 6 wherein said information is readable by using a code key.

8. Process according to claim 1 wherein that the characterizing information contains at least one of a serial number, manufacturing location information, and a test number.

9. A method of manufacturing an assembly comprising at least two components, comprising:

joining said components by means of a plurality of spot joints; and varying relative positions of said spot joints according to a desired information code containing information associated with said assembly.

10. A method of manufacturing an assembly according to claim 9 wherein:

each spot joint has an assigned reference position; and a position of each of said spot joints is varied relative to a reference position thereof, according to said information.

11. A method of manufacturing according to claim 10 wherein said plurality of spot joints are aligned in a linear array.

12. A method of manufacturing according to claim 11, wherein position of each of said spot joints is varied along a longitudinal axis of said linear array.

13. A method of manufacturing according to claim 12 wherein said spot joints are spot welds.

14. A method of marking an information carrying code on an industrial product comprising at least two parts which are joined by spot joints, comprising:

assigning a reference position to each of a plurality of said spot joints; and varying a position of each of said spot joints relative to reference position thereof according to said information carrying code.

15. A method of manufacturing according to claim 14 wherein said plurality of spot joints are aligned in a linear array.

16. A method of manufacturing according to claim 14, wherein position of each of said spot joints is varied along a longitudinal axis of said linear array.

17. A method of manufacturing according to claim 16 wherein said spot joints are spot welds.

* * * * *